US011043311B2

(12) United States Patent
Thomsen, III et al.

(10) Patent No.: US 11,043,311 B2
(45) Date of Patent: Jun. 22, 2021

(54) METHOD OF MAKING ATOMIC NUMBER (Z) GRADE SMALL SAT RADIATION SHIELDING VAULT

(71) Applicant: U.S.A. AS REPRESENTED BY THE ADMINISTRATOR OF NASA, Washington, DC (US)

(72) Inventors: Donald L. Thomsen, III, Yorktown, VA (US); William Girard, Newport News, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 0 days.

(21) Appl. No.: 16/578,981

(22) Filed: Sep. 23, 2019

(65) Prior Publication Data

US 2020/0058414 A1  Feb. 20, 2020

Related U.S. Application Data

(63) Continuation of application No. 15/949,644, filed on Apr. 10, 2018, now Pat. No. 10,600,522.
(Continued)

(51) Int. Cl.
*G21F 1/08* (2006.01)
*G21F 1/12* (2006.01)
(Continued)

(52) U.S. Cl.
CPC .............. *G21F 1/085* (2013.01); *G21F 1/125* (2013.01); *G21F 7/00* (2013.01); *H02S 20/00* (2013.01); *H02S 30/00* (2013.01)

(58) Field of Classification Search
CPC . G21F 1/085; G21F 1/12; G21F 1/125; G21F 7/00; H02S 20/00; H02S 30/00
See application file for complete search history.

(56) References Cited

U.S. PATENT DOCUMENTS 3,134,020 A * 5/1964 Shoenfeld ................ G21F 3/00
                                                      250/517.1
4,514,640 A * 4/1985 Bagnell ..................... G21F 3/00
                                                      250/517.1
(Continued)

FOREIGN PATENT DOCUMENTS

CN     105609151 A  *  5/2016
EP     1477991 A1  * 11/2004   ............... G21F 7/00

OTHER PUBLICATIONS

NCRP 49: Structural Shielding Design and Evaluation for Medical Use of X-Rays and Gamma-Rays Up to 10 MeV, https://law.resource.org/pub/us/cfr/ibr/005/ncrp.49.1976.pdf (Year: 1976).*

*Primary Examiner* — David E Smith
(74) *Attorney, Agent, or Firm* — Shawn P. Gorman; Jonathan B. Soike; Helen M. Galus

(57) ABSTRACT

A radiation shielded vault structure includes a rigid outer structure comprising a plurality of rigid structural components that are interconnected at elongated joints to define an interior space. The structural components include a layer of lower atomic number (Z) material such as aluminum alloy and one or more layers of higher atomic number (Z) material titanium and/or tantalum. The vault structure may include radiation shield members extending along the elongated joints to provide radiation shielding at the elongated joints. The shield members comprise a higher atomic number (Z) material such as titanium or tantalum. The rigid structural components may comprise plate members that are interconnected along side edges thereof. End plates may be attached to the plate members to close off the interior space.

16 Claims, 8 Drawing Sheets

Related U.S. Application Data

(60) Provisional application No. 62/483,646, filed on Apr. 10, 2017, provisional application No. 62/624,876, filed on Feb. 1, 2018, provisional application No. 62/484,048, filed on Apr. 11, 2017, provisional application No. 62/624,872, filed on Feb. 1, 2018.

(51) Int. Cl.
*G21F 7/00* (2006.01)
*H02S 20/00* (2014.01)
*H02S 30/00* (2014.01)

(56) References Cited

U.S. PATENT DOCUMENTS

| | | | | |
|---|---|---|---|---|
| 6,605,818 B1* | 8/2003 | Cornog | | G21F 1/08 |
| | | | | 250/505.1 |
| 10,311,989 B2* | 6/2019 | Campbell | | G21F 5/06 |
| 2004/0004196 A1* | 1/2004 | DeMeo | | D06N 3/0056 |
| | | | | 250/516.1 |
| 2008/0276554 A1* | 11/2008 | Sheetz | | G21F 1/125 |
| | | | | 52/239 |
| 2016/0012926 A1* | 1/2016 | Lehnert | | G21F 5/012 |
| | | | | 250/506.1 |

* cited by examiner

METHOD OF MAKING ATOMIC NUMBER (Z) GRADE SMALL SAT RADIATION SHIELDING VAULT

CROSS-REFERENCE TO RELATED PATENT APPLICATION(S)

This patent application claims the benefit of priority and is a continuation of U.S. patent application Ser. No. 15/949,644, titled "Method of Making Thin Atomic (Z) Grade Shields" and filed on Apr. 10, 2018, which claims the benefit of and priority to U.S. Provisional Application No. 62/483,646, filed on Apr. 10, 2017, entitled, "Method of Making Thin Atomic (Z) Grade Shields"; U.S. Provisional Application No. 62/624,876, filed on Feb. 1, 2018, entitled "Method of Making Thin Atomic (Z) Grade Shields"; U.S. Provisional Application No. 62/484,048, filed on Apr. 11, 2017, entitled, "Method of Making Atomic Number (Z) Grade Small SAT Radiation Shielding Vault"; and U.S. Provisional Application No. 62/624,872, filed on Feb. 1, 2018, entitled, "Method of Making Atomic Number (Z) Grade Small SAT Radiation Shielding Vault". The present application is also related to U.S. Patent Application Publication Nos. 2017/0032857, titled "Atomic Number (Z) Grade Shielding Materials and Methods of Making Atomic Number (Z) Grade Shielding" filed on Aug. 1, 2016 and 2012/0023737, titled "Methods of Making Z-Shielding" filed on Jul. 27, 2011. The contents of the above identified patent applications are hereby incorporated by reference in their entirety.

STATEMENT REGARDING FEDERALLY SPONSORED RESEARCH OR DEVELOPMENT

The invention described herein was made in the performance of work under a NASA contract and by an employee of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

BACKGROUND

Various types of radiation shielding have been developed to protect devices and other items that are exposed to radiation. Some devices may have aluminum outer structures with electronics disposed inside the outer structure. Radiation shielding may be achieved by increasing the thickness of these aluminum structures to protect the electronics or other items inside the structure. However, increasing thicknesses of such structures may be problematic if the inner and/outer dimensions of the structure cannot be varied due to various design constraints. Thus, known radiation shielding methods/structures may not be suitable for certain applications.

BRIEF SUMMARY

One aspect of one or more embodiments relates to a radiation shielded vault structure made from layers of material having higher and lower atomic numbers (Z) to reduce the total ionizing dose of radiation. The vault structure may include a rigid outer structure comprising at least first and second rigid structural components that are interconnected at elongated joints to define an interior space. Each of the first and second structural components have inner and outer sides. The first and second rigid structural components may include a layer of lower Z material such as aluminum alloy on the outer side, and one or more layers of a higher Z material. In particular, a layer of titanium may be bonded to the layer of aluminum alloy, and a layer a layer of tantalum may be bonded to the layer of titanium. The vault structure includes radiation shield members extending along the elongated joints to provide radiation shielding at the elongated joints. The shield members may comprise a higher atomic number material such as titanium or tantalum. The rigid structural components may comprise rectangular plate members that are interconnected alongside edges thereof to form a four-sided primary structure having opposite ends. End plates may be attached to the primary structure to close off the opposite ends and shield the interior space. The end plates may have substantially the same layered construction as the first and second rigid structural components, and may include one or more layers of lower Z material and one or more layers of higher Z material. Alternatively, the rigid structural components may be generally U-shaped members that are interconnected along edges to form a clam shell type structure. End plates may be utilized to close off the clam shell structure. The use of both higher and lower Z materials in the vault structure provides radiation shielding while minimizing the thicknesses of the structure components. A lower Z material such as aluminum absorbs protons and some low energy single event effects. The use of one or more layers of higher Z material such as titanium 51 or tantalum 52 provides radiation shielding against electrons and low energy photons.

Another aspect of one or more embodiments relates to a method of fabricating a radiation shielded vault. The method includes forming a plurality of outer vault members having inner and outer sides. The outer vault members are formed by coating at least a portion of one side of a sheet of a first material with a second material. The first material has a first atomic number, and the second material has a second atomic number that is greater than the first atomic number. The first material may comprise an aluminum alloy or other suitable material, and the second material may comprise titanium, tantalum, or other material having a higher atomic number. The outer vault members are interconnected with the inner sides thereof facing an interior space of the vault that is formed by the outer vault members.

The vault may be constructed to provide a predefined radiation shielding capability. For example, if the first material comprises aluminum that is about 0.188 inches thick, and the second material comprises a layer of tantalum that is about 0.040 inches to about 0.060 inches, the vault structure will provide at least about 3 g/cm$^2$ areal density shielding. The lower Z material (e.g. aluminum) provides protection against protons and some low energy single event effects, and the higher Z material (e.g. tantalum) protects against electrons and low energy photons. This vault construction provides structural support and also provides radiation shielding, without requiring excessive wall thickness. This minimizes the exterior dimensions of the vault and maximizes the volume of the interior (radiation shielded) space within the vault relative to a vault constructed solely of a lower Z material such as aluminum alloy.

The vault structure may be utilized to provide radiation shielding in a wide range of applications. For example, the radiation shielding vault may be utilized in aerospace applications and in ground-based processes that produce radiation.

These and other features, advantages, and objects of the present disclosure will be further understood and appreci-

DETAILED DESCRIPTION

Figure 1:
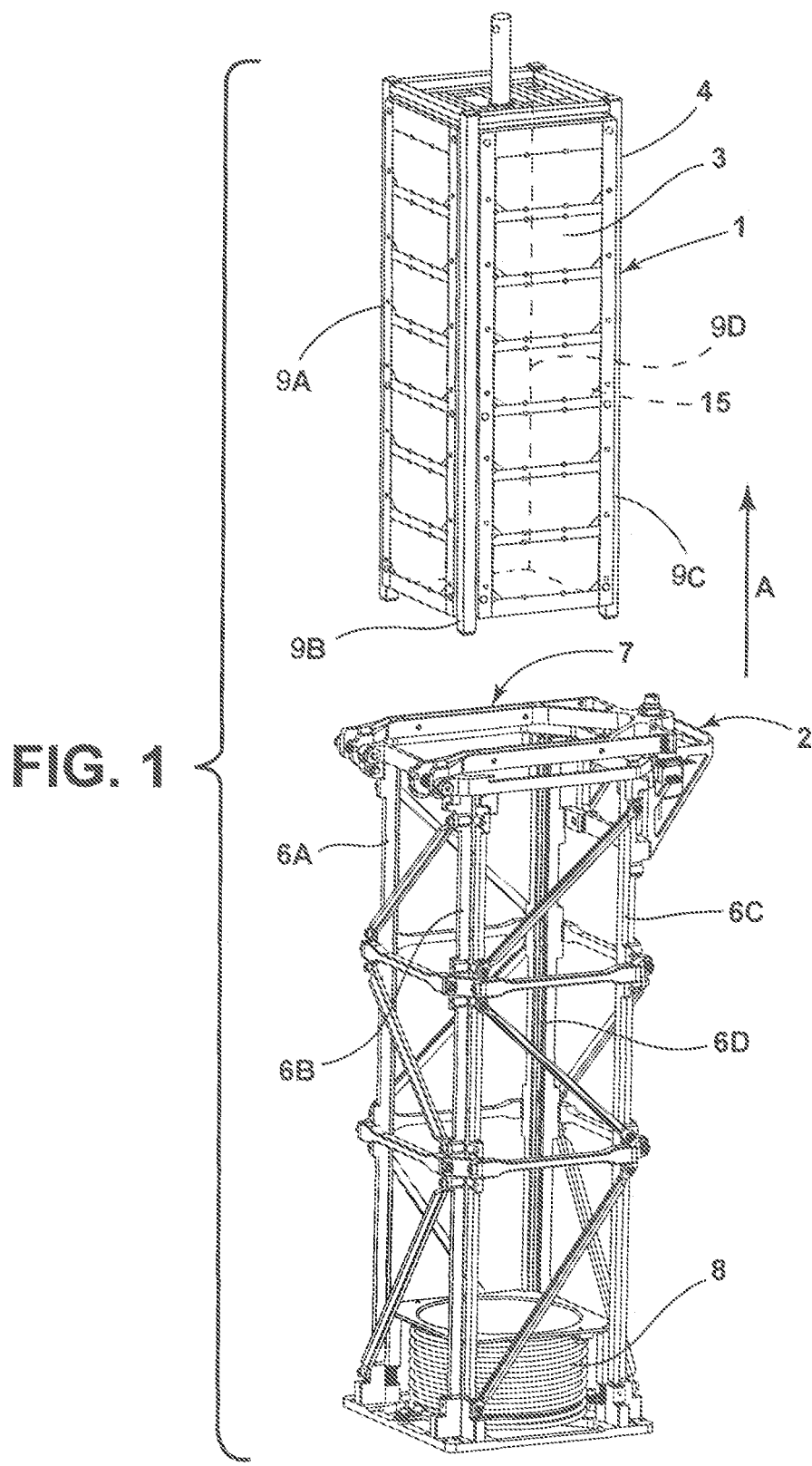
FIG. 1 is an exploded isometric view of an electronic unit including a radiation shielded vault and a support structure configured to removably support the electronic unit.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, an electronic unit 1 may be slidably/removably received in a support structure 2. The electronic unit 1 may be released from the support structure 2 in the upper atmosphere. Accordingly, the electronic unit 1 may be exposed to relatively large amounts of radiation. As discussed in more detail below, the electronic unit 1 may include various electrical internal components that must be shielded from radiation.

Figure 2:
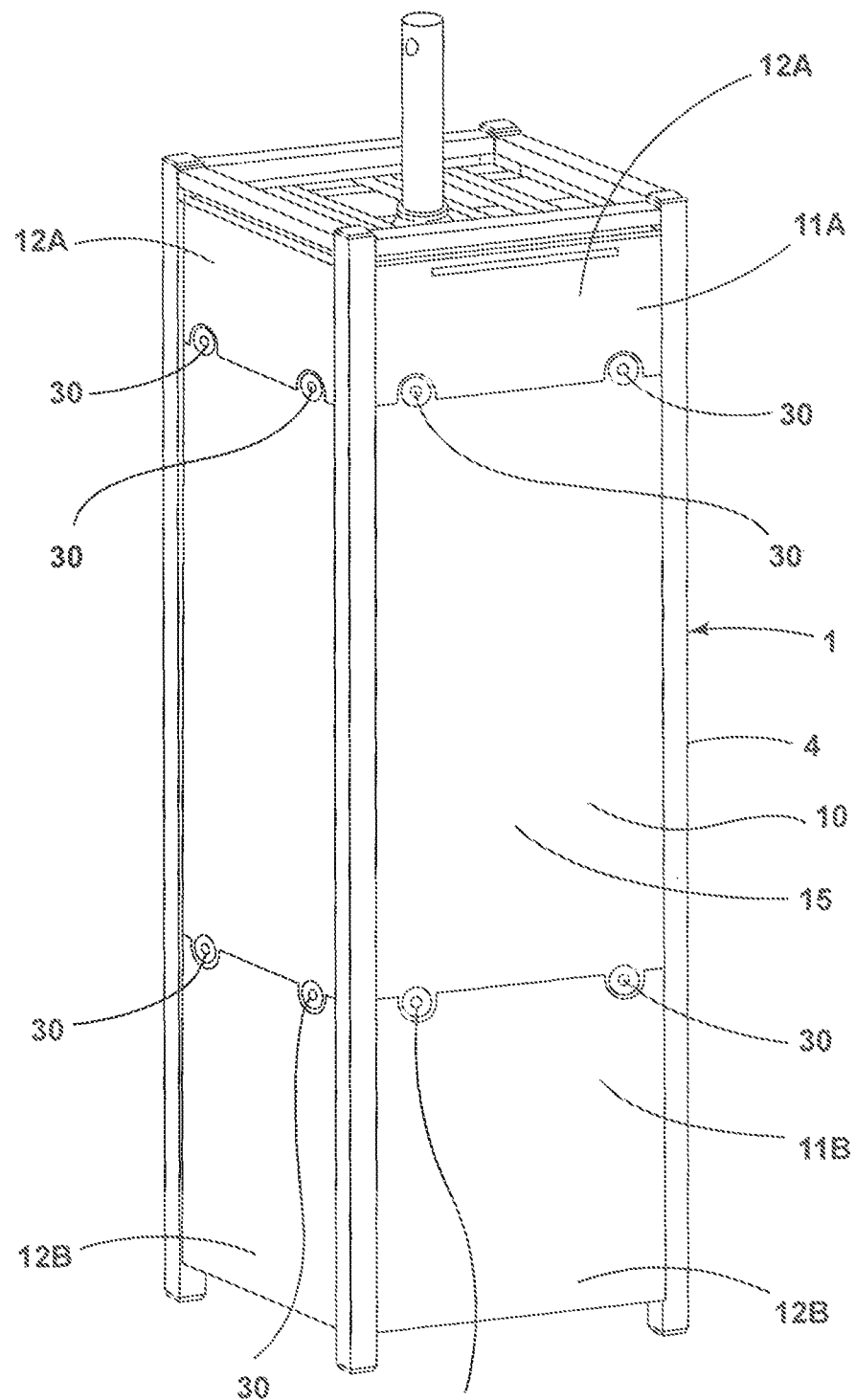
FIG. 2 is an isometric view of an electronic unit including a radiation shielded vault.

The electronic unit 1 includes a structure 4 with outer edges or corners 9A-9D that slidably engage corresponding guides 6A-6D of support structure 2. As discussed below in connection with FIG. 6, corners 9A-9D may comprise anodized aluminum. The electronic unit 1 may be initially stored in the support structure 2, and removed by releasing retaining structure 7 such that a resilient member 8 pushes the electronic unit 1 from the support structure 2. The electronic unit 1 may include a plurality of solar cells 3 disposed on outer sides of the structure 4. In FIG. 2, the solar cells 3 are not shown to thereby show the structure 4 of the electronic unit 1. With further reference to FIG. 2, the electronic unit 1 may include a central portion 10, and end portions 11A and 11B.

Figure 3:
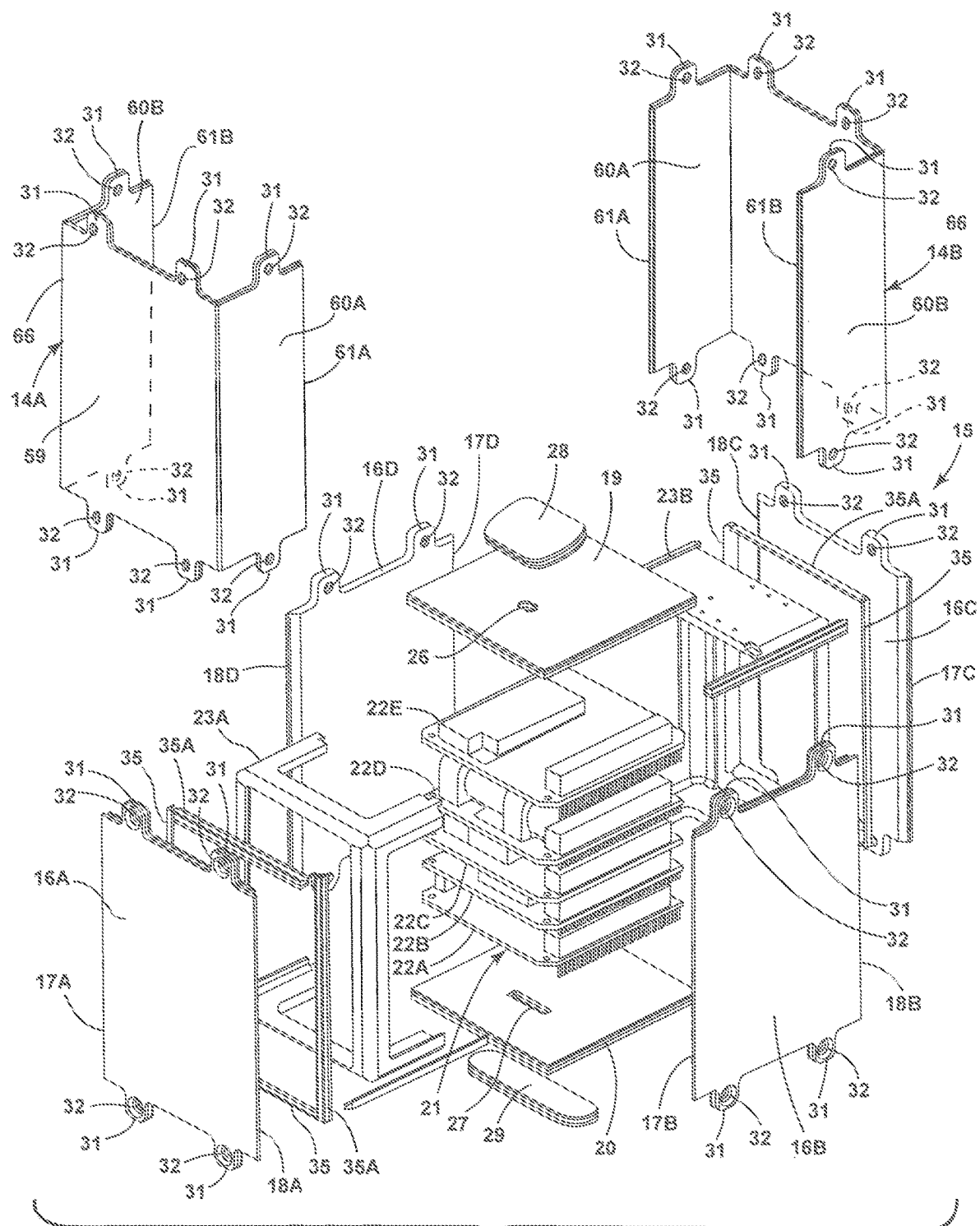
FIG. 3 is an exploded isometric view of a radiation shielded vault.
Figure 4:
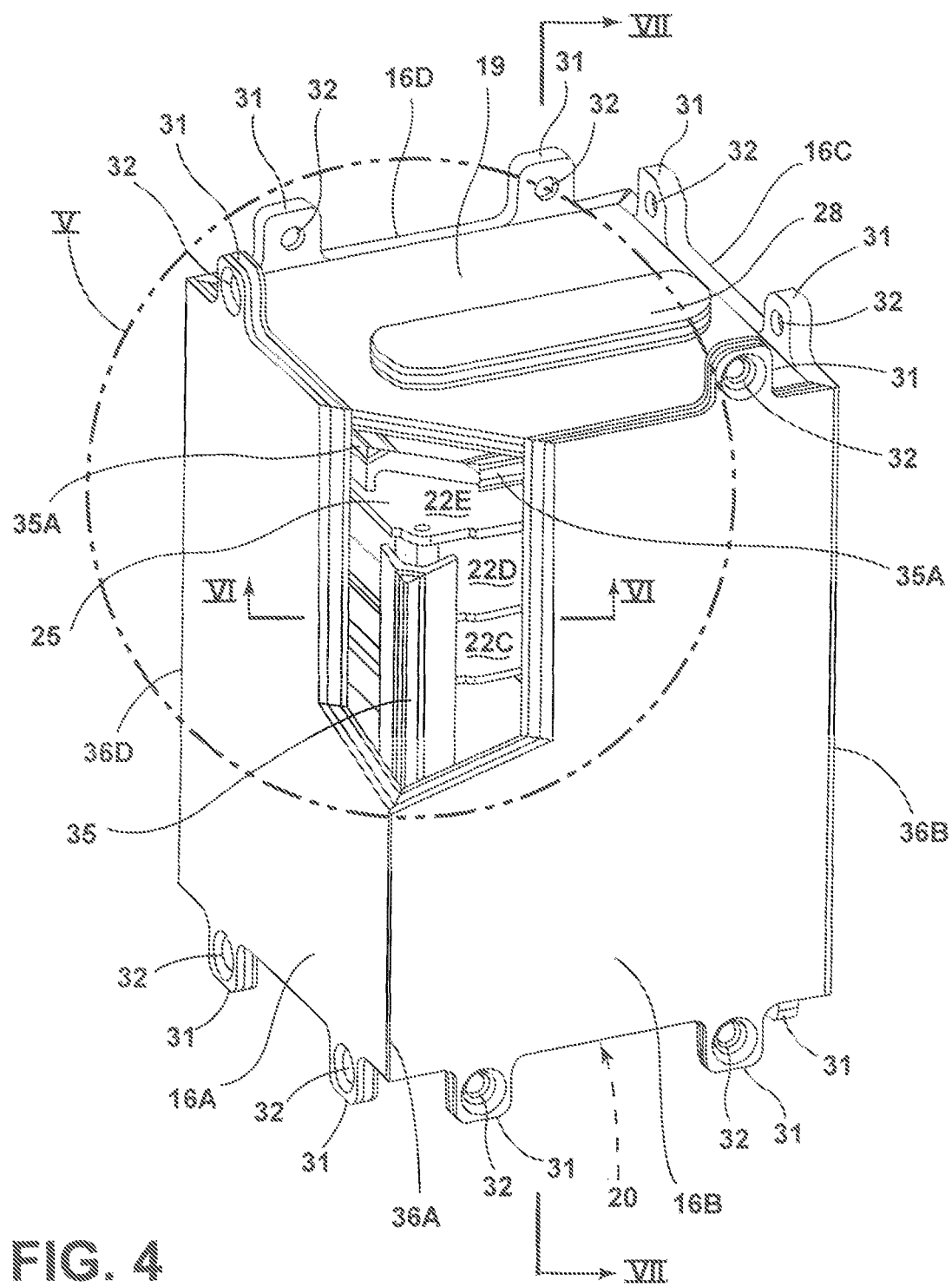
FIG. 4 is a partially fragmentary view of a radiation shielded vault.

With further reference to FIG. 3, the central portion 10 of electronic unit 1 may comprise a radiation-shielded vault 15. The vault 15 may include a plurality of plate-like rectangular outer vault members 16A-16D that are interconnected along edges 17A-17D and 18A-18D. As discussed in more detail below, a pair of U-shaped outer vault members 14A and 14B may be utilized instead of the outer vault members 16A-16D. The vault 15 may include an upper plate member 19, and a lower plate member 20 that close off an interior space 25 (see also FIG. 4) when the outer vault members 16A-16D are assembled. The outer vault members 16A-16D and upper and lower plates 19 and 20, respectively, may be constructed of a layer 50 (FIG. 6) of lower Z (i.e. lower atomic number) material such as an aluminum alloy, and one or more layers 51, 56 of a higher Z (e.g. higher atomic number) material such as titanium or tantalum that may be formed on the lower Z material utilizing a plasma or thermal spraying process. The outer vault members 16A-16D and upper and lower plates 19 and 20, respectively, form a rigid structure that is capable of supporting various internal components 21 in the internal space 25 and also provide radiation shielding to protect internal components 21 from radiation. The layers of higher Z material increase radiation protection without the excessive thickness that would be required if the vault were to be constructed from only aluminum alloy or other lower Z material. A lower Z material such as aluminum absorbs protons and some low energy single event effects. The use of one or more layers of higher Z material such as titanium 51 or tantalum 52 provides radiation shielding against electrons and low energy photons.

In the illustrated example, the internal components 21 comprise a plurality of electronics cards 22A-22E that are disposed parallel to one another in a stacked configuration. Internal support structures 23A and 23B (FIG. 3) may be utilized to support the electronics cards 22A-22E in the proper location within the interior space 25 of vault 15. Upper plate 19 may include a feed through opening 26, and lower plate 20 may include a feed through opening 27. Radiation shielding plate members 28 and 29 extend over the feed through openings 26 and 27 to prevent line of site radiation entry through feed through openings 26 and 27. The plates 20 and 29 may be constructed of substantially the same materials as outer vault members 16A-16D and upper and lower plates 19 and 20, respectively. The feed through openings 26 and 27 permit cables, power lines, and other items to pass from the interior space 25 of vault 15 to the outside of vault 15. For example, the solar cells 3 (FIG. 1) may be electrically connected to the internal components 21 by one or more electrical power lines that pass through feed through opening 26 and/or feed through opening 27.

Figure 7:
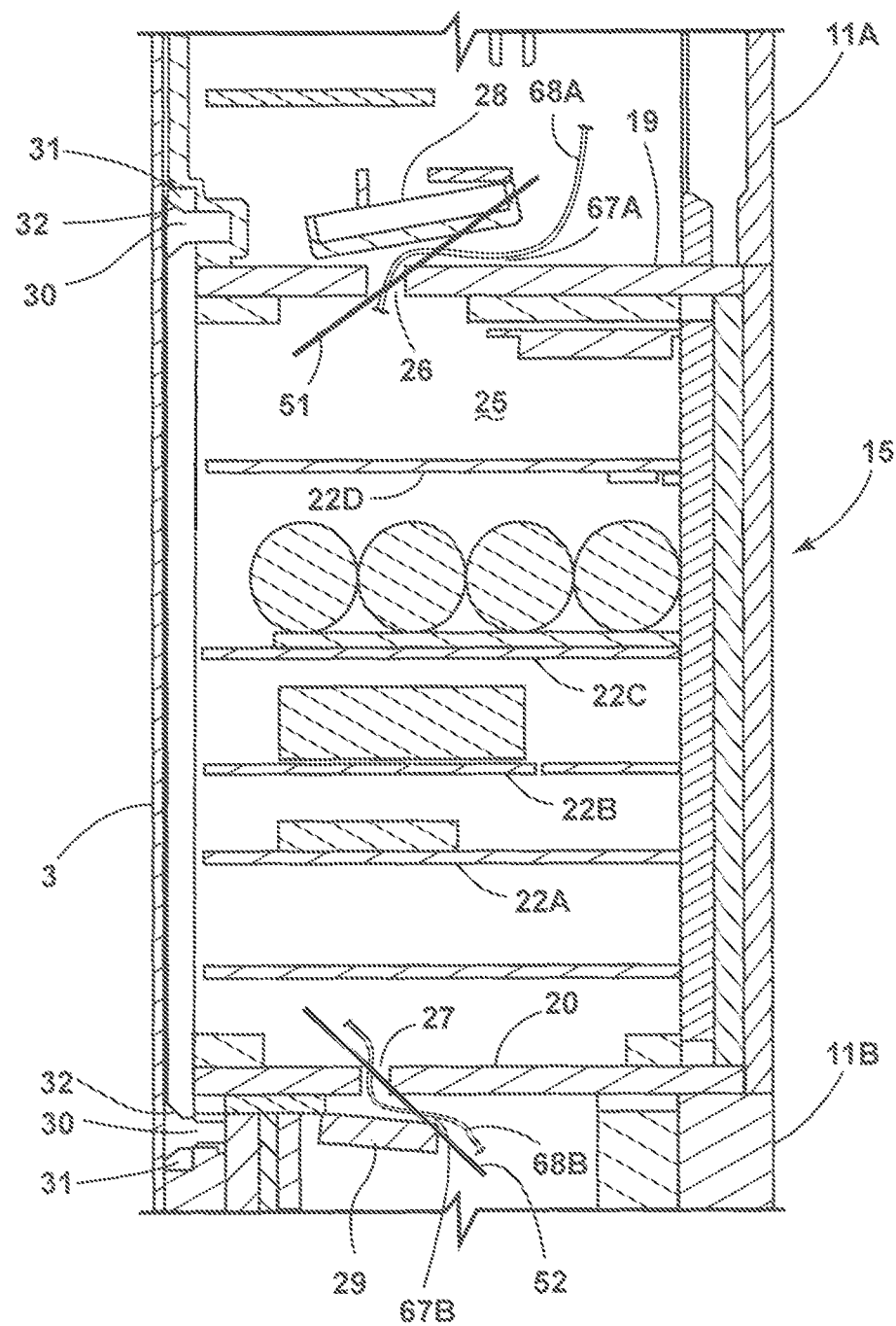
FIG. 7 is a partially fragmentary cross sectional view of the vault of FIG. 4 taken along the line VII-VII.

Each outer vault member 16A-16D may include a plurality of tabs 31 with openings 32 that receive threaded fasteners (FIG. 2) to interconnect the vault 15 with end portions 11A and 11B of primary structure 4 (see also FIG. 7). As discussed in more detail below, the vault 15 may include a plurality of elongated shield members 35 that extend along joints 36A-36D (see also FIG. 4) formed at the interconnection between adjacent edges 18A, 17B etc. Shield members 35A may also be positioned to extend along the joints formed by upper and lower plates 19 and 20 with the outer vault members 16A-16D.

Figure 5A:
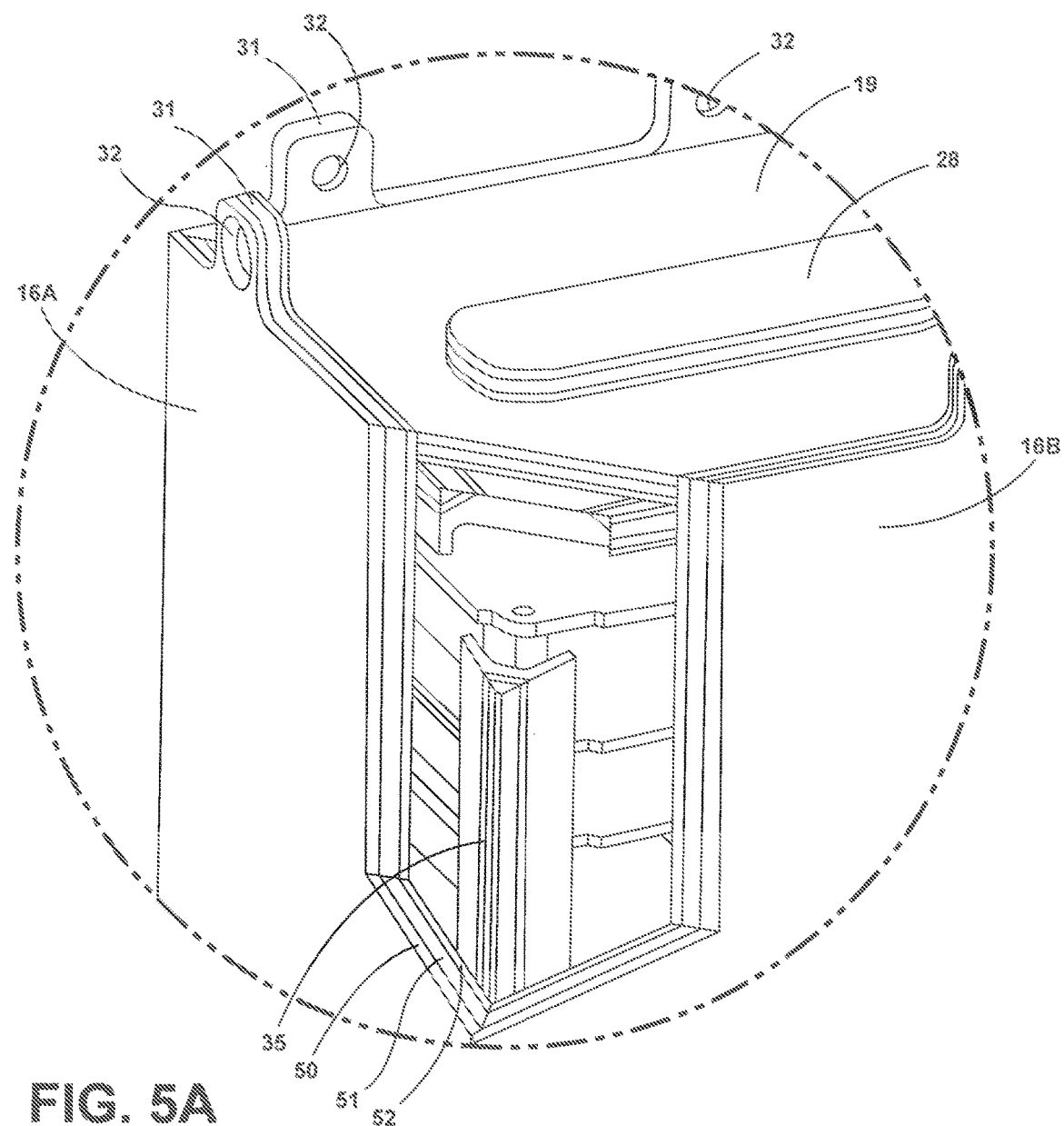
FIG. 5A is a partially fragmentary enlarged view of a portion of the radiation shielded vault of FIG. 4.
Figure 5B:
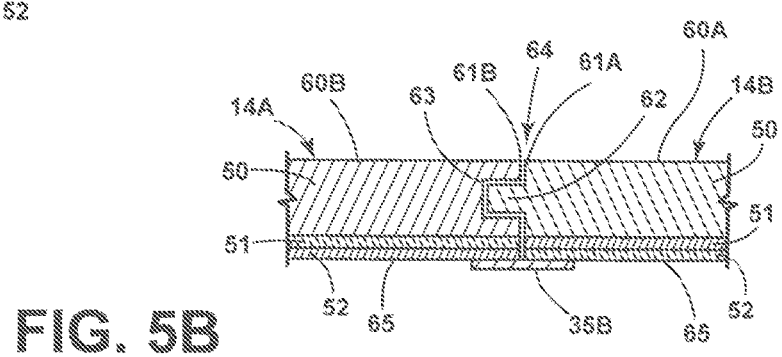
FIG. 5B is a fragmentary cross sectional view of a vault joint.
Figure 6:
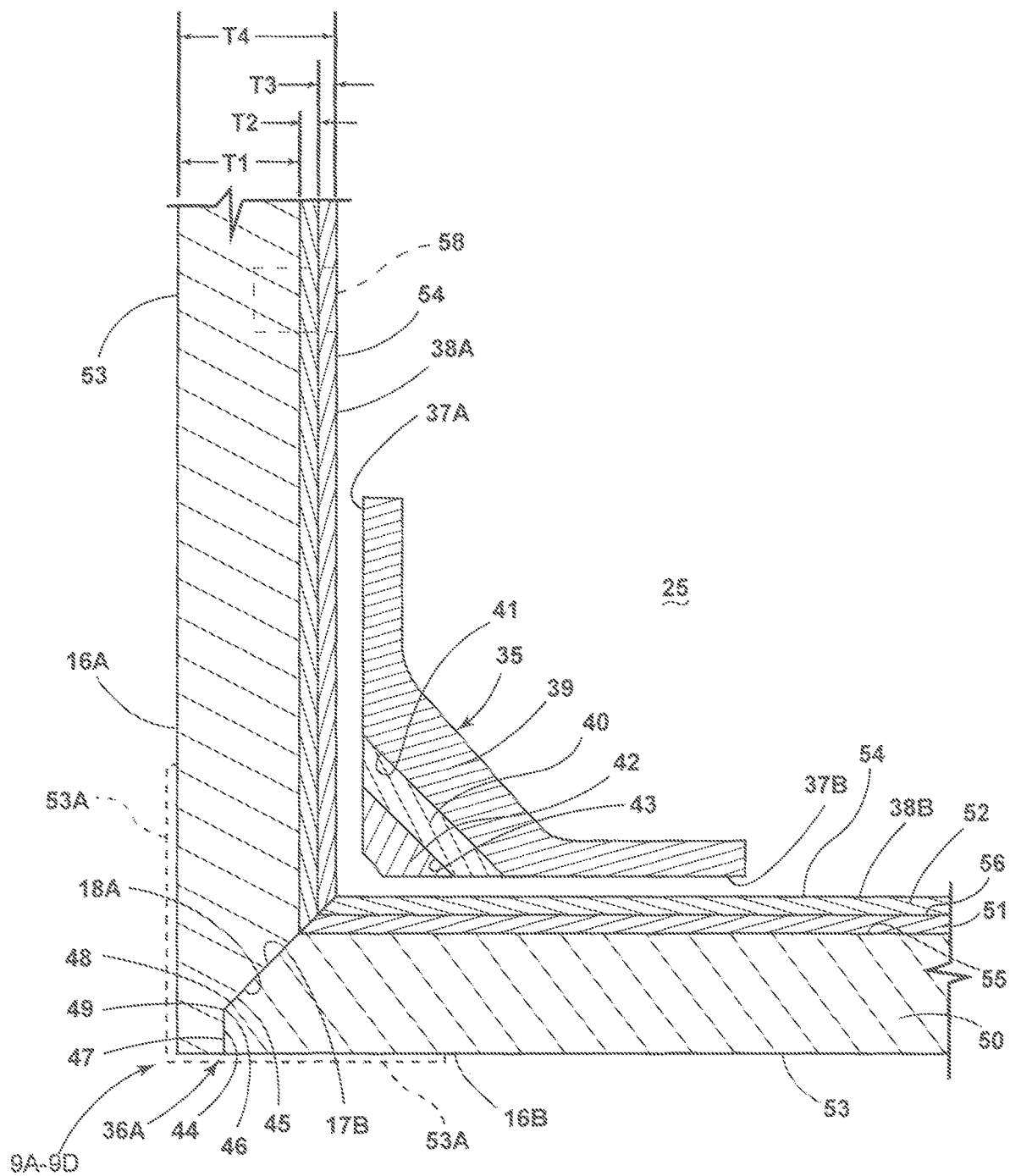
FIG. 6 is a partially fragmentary cross sectional view of a portion of the vault of FIG. 4 taken along the line VI-VI.

With further reference to FIGS. 5 and 6, shield members 35 may be generally V-shaped with orthogonal outer surfaces 37A and 37B that fit closely against inner surfaces 38A and 38B of adjacent outer vault members 16A and 16B when assembled. Shield members 35 may be secured to vault members 16A-16D by adhesives and/or threaded fasteners.

For clarity, the surfaces 37A and 37B of shield member 35 are shown spaced apart from inner surfaces 38A and 38B in FIG. 6. However, it will be understood that when vault 15 is fully assembled, surfaces 37A and 37B abut surfaces 38A and 38B, respectively. The shield members 35 prevent line of site entry of radiation if a gap is formed at joint 36A due to machining tolerances or the like. An elongated shield member 35 may be positioned at each of the joints or corners 36A-36D. Shield members 35 may be formed from a higher Z material such as tungsten or tantalum to provide radiation shielding, and may optionally include a layer of lower Z material. For example, shield members 35 may include a first portion 39 that is made from an aluminum alloy, a second portion 40 comprising titanium that is formed by a thermal or plasma spraying process on a surface 41 of first portion 39. The shield members 35 may further include an outer or corner member 42 that is made from a tantalum material that is formed on a surface 43 of the titanium material 40 utilizing a thermal or plasma spray process.

The outer vault members 16A and 16B include edges 18A and 17B, respectively. The edge 18A may include a first flat portion 44 and a second flat portion 45 that form an elongated groove 46. Edge 17B may include first and second flat portions 47 and 48 that form a raised ridge 49. When assembled, first flat surface 44 engages first flat surface 47, and second flat surface 45 engages second flat surface 48, and ridge 49 engages elongated groove 46. The geometry of the joint 36A thereby prevents a line of site path for radiation through aluminum layer 50 at joint 36A. It will be understood that the other joints between outer vault members 16A-16D, and between end plates 19 and 20 and outer vault members 16A-16D may have a similar geometry to the joint 36A of FIG. 6. Thus, the geometry of the surfaces of the aluminum alloy material 50 prevent line of site radiation through the lower Z aluminum material 50, and the higher Z shield members 35 ensure that the higher Z material also does not form line-of-site gaps that could otherwise permit radiation to pass therethrough.

Referring again to FIG. 6, each outer vault member 16A-16F may include a first layer 50, a second layer 51, and a third layer 52. The layer 50 may comprise aluminum alloy or other suitable lower Z material forming an outer side surface or face 53 of each outer vault member 16A-16D. Portions 53A of surfaces 53 may be anodized to form corners 9A-9D (FIG. 1) that slidably engage support structure 2 and prevent direct contact between the aluminum layer 50 with support structure 2. The anodizing may comprise class III hard anodizing per MIL-A-8625F. The layers 51 and 52 may be formed of a higher Z material forming an inner side face 54 of each outer vault member 16A-16D. In one or more embodiments, the layer 51 comprises a titanium material that is deposited, e.g., utilizing a plasma spray process, to form the titanium layer 51 on surface 55 of aluminum layer 50. The tantalum layer 52 may then be formed, for example, utilizing a plasma spray process to coat surface 56 of titanium layer 51. Although a layer of tantalum may be formed directly on surface 55 of aluminum layer 50, in some embodiments a more secure bonding may be achieved if a titanium layer 51 is first formed on aluminum layer 50, followed by forming a tantalum layer 52 on titanium layer 56.

The layer 50 may have a thickness T1, the layer 51 may have a thickness T2, and the layer 52 may have a thickness T3. The thicknesses T1, T2, and T3 may be varied as required to provide a desired degree of radiation shielding. For example, if the vault members 16A-16D include only a lower Z layer 50 and a single higher Z layer 52, the aluminum alloy layer 50 may have a thickness T1 of about 0.055 inches, and tantalum layer 52 may have a thickness T3 of about 0.010 inches. In this example, tantalum layer 52 may be applied directly to the aluminum layer 50. This 2 layer construction provides a significant reduction of radiation and plasma induced environmental effects relative to a vault structure made solely from an aluminum alloy. If a greater degree of radiation shielding is required, the thickness T1 of lower Z (e.g. aluminum alloy) layer 50 may be in the range of about 0.18-0.200 inches, and the thickness T3 of the tantalum layer 52 may be about 0.040 inches to about 0.060 inches, for example, thereby providing about 3 g/cm² areal density shielding. The thickness T2 of the titanium layer 51 may be relatively thin (e.g., 0.005 inches-0.020 inches) to minimize the overall thickness T4 of the outer vault members while still permitting adequate radiation shielding due to the tantalum material 52. Although it may be possible to form a tantalum layer directly on an aluminum surface, tantalum may not form a sufficiently strong bond to aluminum. Thus, a titanium layer 51 may be utilized between the aluminum alloy layer 50 and the tantalum layer 52. In general, titanium forms a strong bond with both aluminum and tantalum. Thus, a layer of titanium may be utilized between the aluminum and the tantalum if required for a particular application.

As discussed above, the vault 15 may be configured to support one or more internal components 21 such as electronics cards 22A, 22B, etc. If the support structure 2 (FIG. 1) has a standard size and configuration, the overall dimensions of the electronic unit 1 may be limited due to the spacing between the guides 6A-6D of support structure 2. Also, the electronics cards 22A, 22B etc. may have standard dimensions. If the thickness T4 (FIG. 6) of the outer vault members 16A-16D does not permit electronics cards 22A, 22B etc. to fit in the interior space 25, pairs of grooves 58 (FIG. 6) may be formed in opposite inner side faces 54 of the outer vault members 16A-16D. The grooves 58 are configured to receive the edges of electronics cards 22A, 22B, etc. to support cards 22A, 22B etc. The grooves 58 may be formed in surface 55 of aluminum layer 50 prior to coating aluminum layer 50 with titanium layer 51 and tantalum layer 52. The dimensions of the groove 58 formed in aluminum 50 prior to coating with titanium 51 and tantalum 52 may be larger to account for the thicknesses of the titanium layer 51 and tantalum layer 52 which may coat the grooves 58 formed in the aluminum material 50. Alternatively, the grooves 58 may be formed by machining after the titanium layer 51 and tantalum 52 are formed. Although the grooves 58 may reduce the radiation shielding somewhat, the grooves 58 are preferably quite small, such that effective radiation shielding is still achieved.

Referring again to FIG. 3, as discussed above, vault 15 may include U-shaped outer vault members 14A and 14B instead of the four plate-like outer vault members 16A-16D. The outer vault members 14A and 14B include a base wall portion 59 and a pair of end walls 60A and 60B that extend orthogonally from the base wall portion 59. End wall portions 60A include elongated edges 61A, and end walls 60B include edges 61B. When assembled, the edges 61A engage edges 61B.

With further reference to FIG. 5A, edges 61A may include an elongated tongue 62, and edges 61B may include an elongated groove 63. When the U-shaped outer vault members 14A and 14B are assembled, the elongated tongues 62 are closely received in the elongated grooves 63 at an elongated joint 64 (gaps at joint 64 in FIG. 5B are shown for clarity, but the components preferably fit closely together with minimal gaps). The tongue and groove joint 64 aligns and interconnects the U-shaped outer vault members 14, and also prevents a line of site radiation path through the aluminum alloy material 50. An elongated shield member 35B may be secured to the inner side faces 65 of U-shaped outer vault members 14A and 14B. The elongated shield member 35B may have a generally rectangular configuration, and may be formed of titanium, tantalum, or other suitable higher Z material to provide additional radiation shielding at the joint 64.

The U-shaped outer vault members 14A and 14B provide a clam shell-type construction with two elongated joints 64 rather than four elongated corner joints 36A-36D formed by outer vault members 16A-16D. The U-shaped outer vault members 14A and 14B may include a plurality of tabs 31 with openings 32 that receive fasteners 30 to interconnect the outer vault members 14A and 14B to the adjacent structures in substantially the same manner as discussed above in connection with the outer vault members 16A-16D. The U-shaped outer vault members 14A and 14B may comprise an aluminum alloy layer 50, a titanium layer 51, and a tantalum layer 52 that are substantially the same as the layers 50, 51, and 52 of the outer vault members 16A-16D as discussed in more detail above. Similarly, the layers 51 and 52 may be formed utilizing a plasma spray process on aluminum layer 50 as described above. In general, the U-shaped outer vault members 14A and 14B may be formed by machining or the like to form an aluminum alloy layer 50 that is generally U-shaped in cross section. The layers 51 and 52 may then be formed utilizing a thermal or plasma spray process as described in more detail above. Alternatively, the U-shaped outer vault members 14A and 14B may be formed from individual aluminum plate members that are welded together at corners 66. The layers 51 and 52 may be applied to the aluminum layer 50 before or after the welding operation.

With further reference to FIG. 7, as discussed above upper plate 19 may include a feed through opening 26, and lower plate 20 may include a feed through opening 27. The feed through opening 26 is substantially covered by plate 28, and feed through opening 27 is covered by plate 29. Plate 28 may be secured to plate 19 by a suitable bracket (not shown), and plate 29 may be secured to plate 20 by a suitable bracket (also not shown). The plates 28 and 29 may have a construction that is substantially similar to the outer vault members 16A-16D. More specifically, the plates 28 and 29 may include an aluminum alloy layer 50, a titanium layer 51, and a tantalum layer 52 to thereby provide for radiation shielding. The plate 28 is sized and positioned to prevent a line of site "S1" that would otherwise permit radiation to pass through opening 26. Similarly, plate 29 is sized and positioned to prevent a line of site "S2" through opening 27 that would otherwise permit radiation to pass through opening 27 into interior space 25. Plates 20 and 29 are spaced apart from plates 19 and 20, respectively to form passageways 67A and 67B, respectively. The passageways 67A and 67B permit electrical lines 68A and 68B or the like to pass through plates 19 and 20 while still providing radiation shielding. The lines 68A and 68B may comprise electrical power lines or other such lines that need to be routed from outside vault 15 to the interior space 25 of vault 15.

Figure 8:
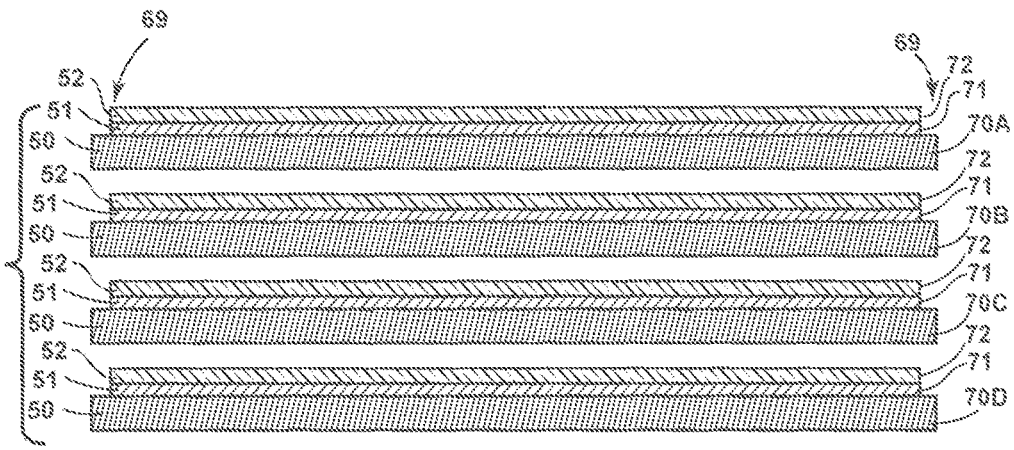
FIG. 8 is a cross sectional view of four rectangular plate members of a radiation shielded vault according to another aspect of the present invention.
Figure 9:
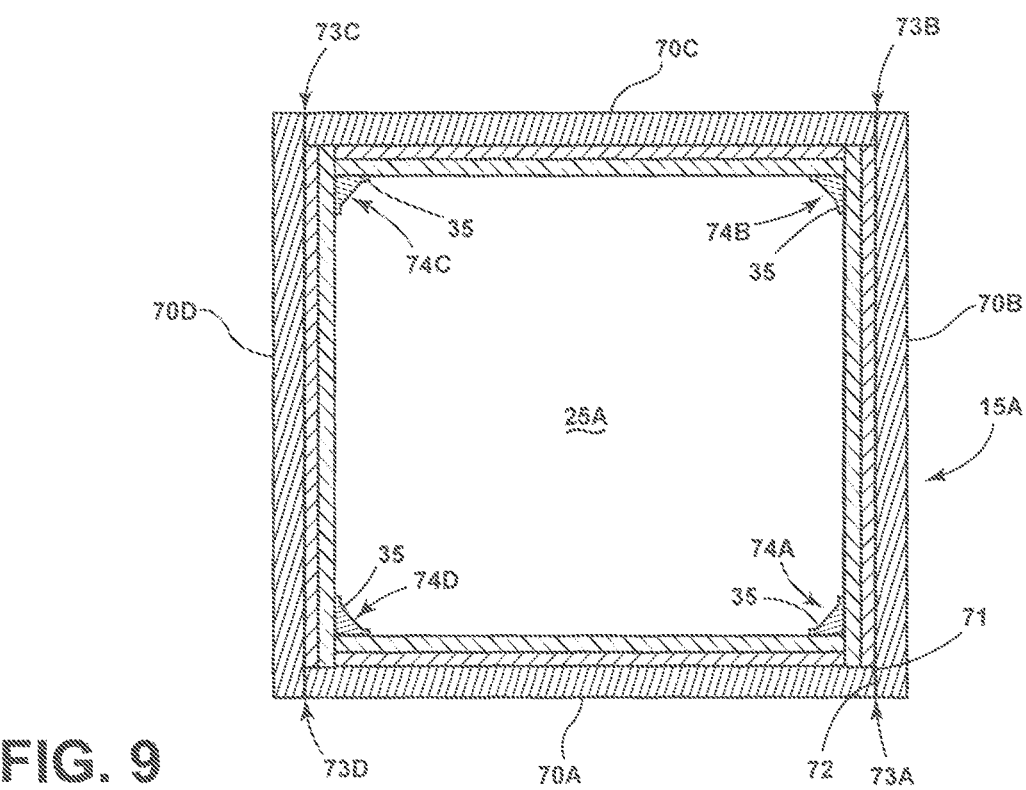
FIG. 9 is a cross sectional view of a radiation-shielded vault constructed from the plates of FIG. 8.

With further reference to FIGS. 8 and 9, a vault 15A according to another aspect of o is formed by outer vault members 70A-70D. Vault members 70A-70D may comprise plate-like members with tabs 31 and openings 32 that are substantially the same as vault members 16A-16D (FIG. 3). However, vault members 70A-70D utilize a different corner joint construction. The vault members 70A-70D may include an aluminum alloy layer 50, a titanium layer 51, and a tantalum layer 52 that may be formed in substantially the same manner as discussed in more detail above in connection with FIG. 6. The outer vault members 70A-70B may be substantially planar with edges 69 including elongated raised ridges 71 and grooves 72 (FIG. 8). The grooves 72 and ridges 71 may be formed by machining the members 70A-70D after the layers 51 and 52 are formed on the aluminum layer 50, or by forming layers 51 and 52 to form grooves 72 and ridges 71. When assembled, ridges 71 engage grooves 72 to form joints 73A-73D as shown in FIG. 9. The engagement of ridges 71 and grooves 72 eliminates line of site gaps that could otherwise occur at joints 73A-73D to thereby prevent entry of radiation into interior space 25A of vault 15A. Although the ridges 71 and grooves 72 are configured to prevent a direct line of site to thereby block radiation at joints 73A-73D, the vault 15A may optionally include elongated shield members 34 extending along inner corners 74A-74D to ensure effective radiation shielding at joints 73A-73D.

Referring again to FIG. 2, the electronic unit 1 may be constructed such that only central portion 10 includes a radiation-shielded vault 15. Thus, the end portions 11A and 11B may be constructed with outer panels 12A and 12B that do not include higher Z materials such as titanium and/or tantalum for radiation shielding. For example, the outer panels 12A and 12B may comprise aluminum alloy that does not have layers of titanium and/or tantalum.

As discussed above, the layer 50 may comprise an aluminum alloy. For example, layer 50 may comprise 5051 aluminum alloy. However, the layer 50 may comprise other suitable lower Z materials. A lower Z material such as aluminum absorbs protons and some low energy single event effects. The use of one or more layers of higher Z material such as titanium 51 or tantalum 52 provides radiation shielding against electrons and low energy photons. Accordingly, the thicknesses of the aluminum layer 50, titanium layer 51, and/or tantalum layer 52 may be adjusted as required to provide the desired degree of radiation shielding with respect to different types of radiation. It will be understood that the vault 15 may be subject to different types of radiation depending upon the particular application. Furthermore, the internal components 21 disposed in interior space 25 may have different radiation shielding requirements depending upon the particular components positioned in the interior space. Accordingly, the thicknesses and types of higher and lower Z materials utilized to form the outer structure of vault 15 may be varied as required for a particular application.

The vault 15 provides structural support for the internal components 21 disposed in the interior space 25, and also protects the internal components 21 from radiation. In particular, the aluminum alloy lower Z material provides a lightweight rigid structure, and the higher Z materials shield against electrons and low energy photons. This permits use of internal components 21 that may otherwise be susceptible to radiation damage. Furthermore, the use of a vault 15 that provides both structural support and radiation shielding eliminates the need to individually shield the internal components 21 from radiation.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A radiation shielded vault structure comprising:
a rigid outer structure comprising at least first and second rigid structural components that are interconnected at elongated joints to define an interior space, wherein each of the first and second rigid structural components have inner and outer sides and comprise a layer of a first material having a lower atomic number, and a layer of a second material having a higher atomic number, wherein:
the first material comprises aluminum alloy, and the second material comprises at least one material selected from the group consisting of titanium and tantalum, such that the first and second rigid structural components comprise a layer of aluminum alloy on the outer side, a layer of titanium bonded to the layer of aluminum alloy, and a layer of tantalum on the inner side that is bonded to the layer of titanium, and
the aluminum alloy has a thickness of 0.055 inches-0.188 inches, and the layer of tantalum has a thickness of 0.010 inches-0.060 inches; and
shield members extending along the elongated joints to provide radiation shielding at the elongated joints, wherein the shield members comprise a higher atomic number material.

2. The radiation shielded structure of claim 1, wherein:
the rigid outer structure provides at least 3 $g/cm^2$ areal density shielding.

3. The radiation shielded structure of claim 1, wherein:
the shield members comprise a material selected from the group consisting of titanium and tantalum.

4. The radiation shield structure of claim 1, wherein:
the rigid outer structure includes at least one feedthrough opening to permit elongated components to pass through the rigid outer structure, and including:
a radiation shielding member extending over the at least one feedthrough opening and preventing a line of site radiation path through the feedthrough opening, wherein the radiation shielding member and the feedthrough opening form a passageway providing access to the interior space from outside the vault structure.

5. The radiation shield structure of claim 4, wherein:
the first and second rigid structural components form opposite ends of the rigid outer structure;
the rigid outer structure includes end plates at each opposite end that are connected to the first and second rigid structural components, and wherein at least one end plate has a feedthrough opening therethrough, and wherein a radiation shielding member is attached to the at least one end plate and extends over the feedthrough opening.

6. The radiation shielded structure of claim 1, wherein:
each of the first and second rigid structural components is generally U-shaped in cross section.

7. The radiation shielded structure of claim 6, wherein:
each of the first and second rigid structural components includes a central wall portion and a pair of extension walls extending transversely from the central wall portion and defining elongated end edges, wherein the end edges of the first rigid structural component are connected to the end edges of the second rigid structural component to form first and second elongated joints; and
wherein first and second shield members extend along the first and second elongated joints, respectively.

8. The radiation shielded structure of claim 7, wherein:
the rigid outer structure has four planar outer side faces that are formed by the first and second rigid structural components.

9. The radiation shielded structure of claim 1, wherein:
the first and second rigid structural components comprise four generally rectangular plates that are interconnected along opposite side edges thereof to form four elongated joints and elongated inner corners at each elongated joint;
at least one shield member is disposed at each inner corner.

10. The radiation shielded structure of claim 9, wherein:
the inner corners comprise orthogonal inner surface portions of the rectangular plates; and
the shield members have orthogonal outer surfaces that fit against the orthogonal inner surface portions.

11. The radiation shielded structure of claim 7, wherein:
the layers of the first material adjacent side edges of the rectangular plates overlap at the elongated joints and prevent line of site radiation through the elongated joints to a center of the interior space.

12. The radiation shielded structure of claim 11, wherein:
each side edge of each rectangular plate includes an elongated groove and an elongated protrusion and wherein the elongated protrusions of each side edge engages an elongated groove in an adjacent side edge.

13. A radiation shielded vault structure comprising:
a rigid outer structure comprising at least first and second rigid structural components that are interconnected at elongated joints to define an interior space, wherein each of the first and second rigid structural components have inner and outer sides and comprise a layer of a first material having a lower atomic number, and a layer of a second material having a higher atomic number;
shield members extending along the elongated joints to provide radiation shielding at the elongated joints, wherein the shield members comprise a higher atomic number material; and
card mounting structures on the inner sides of the rigid structural components, wherein the card mounting structures are configured to support a plurality of electrical cards in a parallel, stacked configuration in the interior space.

14. The radiation shielded structure of claim 13, wherein each of the first and second rigid structural components is generally U-shaped in cross section.

15. A radiation shielded vault structure comprising:
a rigid outer structure comprising at least first and second rigid structural components that are interconnected at elongated joints to define an interior space, wherein each of the first and second rigid structural components have inner and outer sides and comprise a layer of a first material having a lower atomic number, and a layer of a second material having a higher atomic number; and
shield members extending along the elongated joints to provide radiation shielding at the elongated joints, wherein the shield members comprise a higher atomic number material, wherein:
each of the first and second rigid structural components includes a central wall portion and a pair of extension walls extending transversely from the central wall portion and defining elongated end edges, wherein the end edges of the first rigid structural component are connected to the end edges of the second rigid structural component to form first and second elongated joints; and the first and second shield members extend along the first and second elongated joints, respectively.

16. The structure of claim 15, wherein each side edge of each rectangular plate includes an elongated groove and an elongated protrusion and wherein the elongated protrusions of each side edge engages an elongated groove in an adjacent side edge.

\* \* \* \* \*